US011656639B2

(12) United States Patent
John et al.

(10) Patent No.: US 11,656,639 B2
(45) Date of Patent: May 23, 2023

(54) INFORMATION PROCESSING METHOD, UNMANNED AERIAL VEHICLE, AND UNMANNED AERIAL VEHICLE CONTROL SYSTEM

(71) Applicant: Panasonic Intellectual Property Management Co., Ltd., Osaka (JP)

(72) Inventors: Stephen William John, Nara (JP); Kazunobu Konishi, Osaka (JP); Katsuhiko Asai, Nara (JP); Kazuo Inoue, Osaka (JP); Shunsuke Kuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 134 days.

(21) Appl. No.: 17/469,317

(22) Filed: Sep. 8, 2021

(65) Prior Publication Data

US 2021/0405663 A1    Dec. 30, 2021

Related U.S. Application Data

(63) Continuation of application No. PCT/JP2020/003886, filed on Feb. 3, 2020.

(30) Foreign Application Priority Data

May 15, 2019    (JP) .............................. JP2019-092488

(51) Int. Cl.
*G05D 1/12*    (2006.01)
*B64C 39/02*    (2023.01)
(Continued)

(52) U.S. Cl.
CPC ............. *G05D 1/12* (2013.01); *B64C 39/024* (2013.01); *G05D 1/0094* (2013.01); *G05D 1/104* (2013.01);
(Continued)

(58) Field of Classification Search
CPC ....................................................... G05D 1/12
See application file for complete search history.

(56) References Cited

U.S. PATENT DOCUMENTS 9,247,343 B2    1/2016 Nakadai et al.
10,176,792 B1 *  1/2019 Elzinga ................ G10K 11/175
(Continued)

FOREIGN PATENT DOCUMENTS

CN    106772246 A  *  5/2017
CN    109144092 A  *  1/2019
(Continued)

OTHER PUBLICATIONS

International Search Report dated Mar. 17, 2020 in International (PCT) Application No. PCT/JP2020/003886.

*Primary Examiner* — Shelley Chen
(74) *Attorney, Agent, or Firm* — Wenderoth, Lind & Ponack, L.L.P.

(57) ABSTRACT

An information processing method performed by a computer includes: determining whether a target sound has been recognized; when it is determined that the target sound has been recognized, acquiring positions and sound recording directions of unmanned aerial vehicles; acquiring noise-related information regarding noise generated by at least one of the unmanned aerial vehicles; acquiring an estimated position of a sound recording target estimated from the target sound; determining at least one of target positions and target sound recording directions of the unmanned aerial vehicles based on the estimated position of the sound recording target, the positions and the sound recording directions of the unmanned aerial vehicles, and the noise-related information; and outputting, to each of the unmanned aerial vehicles, at least one of a request for moving to the (Continued)

target position and a request for setting the sound recording direction to the target sound recording direction.

14 Claims, 11 Drawing Sheets

(51) Int. Cl.
*G05D 1/00* (2006.01)
*G05D 1/10* (2006.01)
*H04R 1/20* (2006.01)
*B64U 30/20* (2023.01)

(52) U.S. Cl.
CPC ............... *H04R 1/20* (2013.01); *B64U 30/20* (2023.01); *H04R 2499/13* (2013.01)

(56) References Cited

U.S. PATENT DOCUMENTS

| | | | | |
|---|---|---|---|---|
| 2017/0201714 | A1* | 7/2017 | Kim | H04N 7/185 |
| 2017/0234724 | A1* | 8/2017 | Naguib | G01S 5/18 |
| | | | | 367/117 |
| 2019/0228667 | A1* | 7/2019 | Matsumoto | G08G 5/0026 |
| 2020/0084540 | A1* | 3/2020 | John | H04R 29/005 |
| 2021/0256987 | A1* | 8/2021 | Edlin | G10K 11/175 |

FOREIGN PATENT DOCUMENTS

| | | | | | |
|---|---|---|---|---|---|
| EP | 3926976 | A1 | * | 12/2021 | ........... B64C 39/024 |
| JP | 2018026792 | A | * | 2/2018 | ........... B64C 39/024 |
| KR | 1756603 | B1 | * | 7/2017 | ........... B64C 39/024 |
| WO | WO-2005125267 | A2 | * | 12/2005 | ............ H04R 1/406 |
| WO | WO-2018020965 | A1 | * | 2/2018 | ........... B64C 39/024 |

* cited by examiner

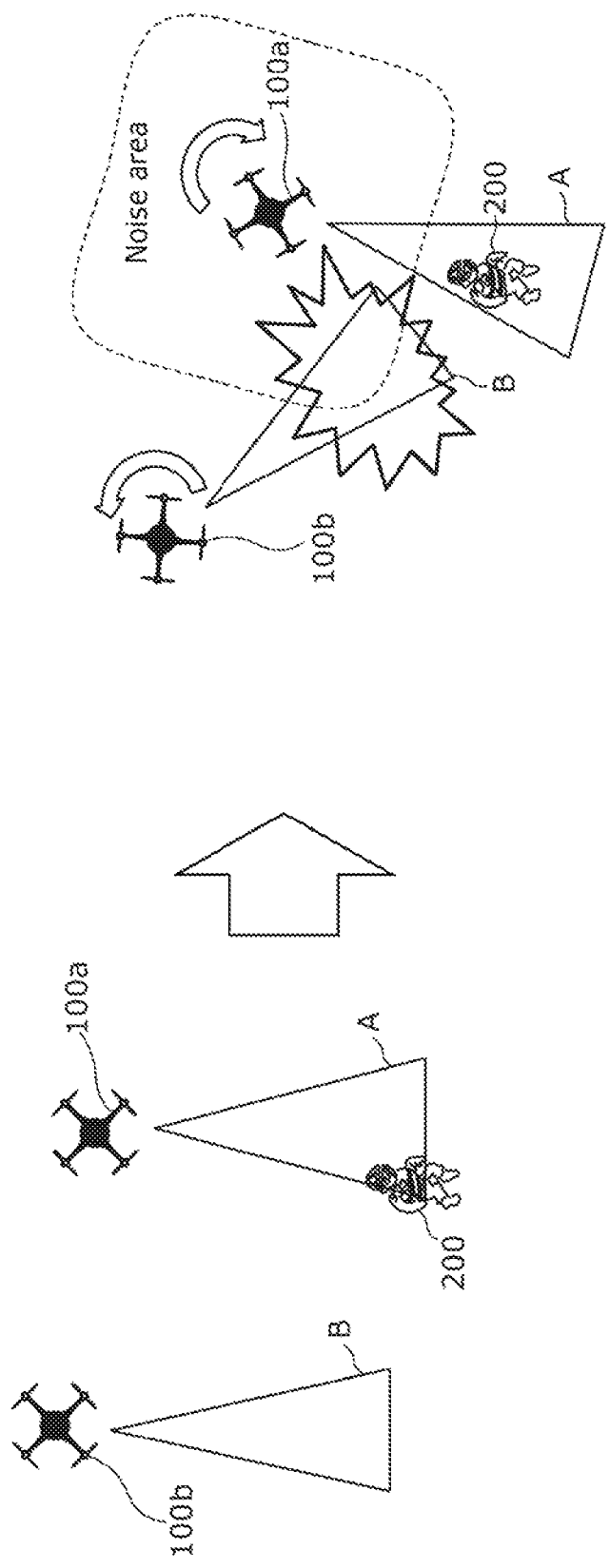

INFORMATION PROCESSING METHOD, UNMANNED AERIAL VEHICLE, AND UNMANNED AERIAL VEHICLE CONTROL SYSTEM

CROSS REFERENCE TO RELATED APPLICATIONS

This is a continuation application of PCT International Application No. PCT/JP2020/003886 filed on Feb. 3, 2020, designating the United States of America, which is based on and claims priority of Japanese Patent Application No. 2019-092488 filed on May 15, 2019. The entire disclosures of the above-identified applications, including the specifications, drawings and claims are incorporated herein by reference in their entirety.

FIELD

The present disclosure relates to an information processing method, an unmanned aerial vehicle, and an unmanned aerial vehicle control system.

BACKGROUND

Patent Literature (PTL) 1 discloses an unmanned aerial vehicle that estimates the position of a source of generation of sound by using a microphone array.

CITATION LIST

Patent Literature

[PTL 1] U.S. Pat. No. 9,247,343

SUMMARY

Technical Problem

For example, the position of a sound recording target may be estimated by using a plurality of unmanned aerial vehicles as disclosed in PTL 1.

However, the quality of sound recording may degrade due to noise caused by rotation of rotors of each unmanned aerial vehicle or the like, and the accuracy of estimating the position of a sound recording target may also deteriorate.

To address this, the present disclosure provides an information processing method, an unmanned aerial vehicle, and an unmanned aerial vehicle control system, with which even when a plurality of unmanned aerial vehicles are used, a target sound can be recorded effectively.

Solution to Problem

The information processing method according to the present disclosure is a method executed by a computer, the information processing method including: determining whether a target sound has been recognized, based on sound data acquired by at least one of a plurality of unmanned aerial vehicles; when it is determined that the target sound has been recognized, acquiring a position and a sound recording direction of each of the plurality of unmanned aerial vehicles; acquiring noise-related information regarding noise generated by the at least one of the plurality of unmanned aerial vehicles; acquiring an estimated position of a sound recording target that is a source of the target sound, the estimated position being estimated from the target sound; determining, based on the estimated position of the sound recording target, the position and the sound recording direction of each of the plurality of unmanned aerial vehicles, and the noise-related information, at least one of a target position and a target sound recording direction of each of the plurality of unmanned aerial vehicles; and outputting, to each of the plurality of unmanned aerial vehicles, at least one of a request for moving to the target position and a request for setting the sound recording direction to the target sound recording direction.

Generic or specific aspects of the present disclosure may be implemented by a system, a method, an integrated circuit, a computer program or a computer-readable recording medium such as a CD-ROM, or may be implemented by any combination of a system, a method, an integrated circuit, a computer program and a recording medium.

Advantageous Effects

With the information processing method, the unmanned aerial vehicle, and the unmanned aerial vehicle control system according to the present disclosure, even when a plurality of unmanned aerial vehicles are used, a target sound can be recorded effectively.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 11 is a diagram illustrating a problem that may occur during recording of a sound generated by a sound recording target by using a plurality of unmanned aerial vehicles.

Figure 1:
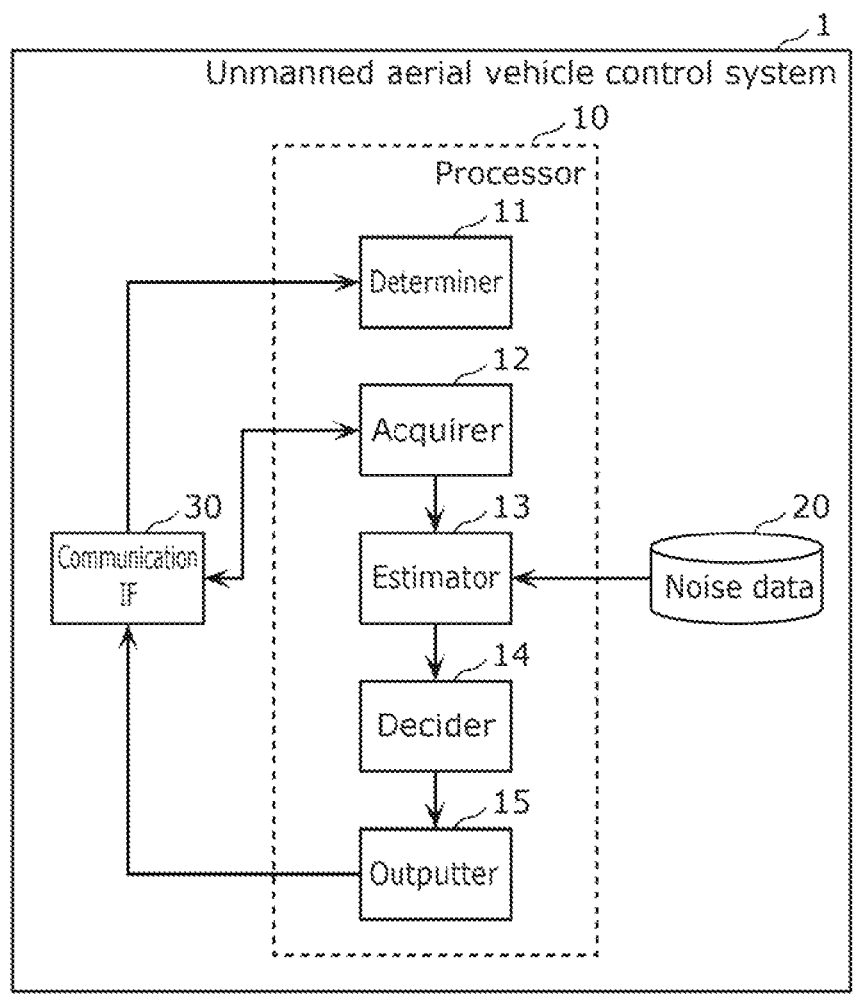
FIG. 1 is a block diagram showing an example of a configuration of an unmanned aerial vehicle control system according to Embodiment 1.

DESCRIPTION OF EMBODIMENTS (Underlying Knowledge Forming Basis of the Present Disclosure)

FIG. 11 is a diagram illustrating a problem that may occur during recording of a sound generated by a sound recording target (also referred to as target sound) by using a plurality of unmanned aerial vehicles. For example, FIG. 11 shows unmanned aerial vehicles 100a and 100b as the plurality of unmanned aerial vehicles. Also, FIG. 11 shows sound recording target 200 as the target whose sound is to be recorded by the plurality of unmanned aerial vehicles.

For example, for the purpose of security, rescue during disaster, or the like, improvement in the quality of sound recording of a sound generated by sound recording target 200 and high accuracy estimation of the position of sound recording target 200 have been desired. FIG. 11 shows an example in which unmanned aerial vehicles are used for the purpose of security, and sound recording target 200 is a suspicious person.

In order to implement this, for example, each unmanned aerial vehicle includes a microphone array composed of a plurality of microphone elements. The microphone array is capable of beamforming that uses the difference in sound pickup time between microphone elements, and the direction of directivity can be controlled to an arbitrary direction. That is, with the unmanned aerial vehicle that includes the microphone array, the sound recording direction can be limited to a specific direction, and when a target sound in the specific direction is picked up, the unmanned aerial vehicle can recognize that sound recording target 200 is present within a sound recording area (directivity coverage) based on the specific direction. For example, as shown in FIG. 11, when a target sound is picked up in sound recording area A, unmanned aerial vehicle 100a can recognize that sound recording target 200 is present within sound recording area A.

At this time, unmanned aerial vehicle 100a can recognize that sound recording target 200 is present within sound recording area A, but cannot know the details of the position. To address this, for example, triangulation or the like may be performed by using a plurality of unmanned aerial vehicles. By using a plurality of unmanned aerial vehicles, it is possible to determine that sound recording target 200 is present in an area around a point where the sound pickup directions of the plurality of unmanned aerial vehicles meet when the plurality of unmanned aerial vehicles pick up the target sound (specifically, an overlapping area of the sound pickup areas of the plurality of unmanned aerial vehicles).

However, when the target sound is recorded by the plurality of unmanned aerial vehicles, noise generated by one of the unmanned aerial vehicles (for example, a flight sound generated as a result of the rotors of the unmanned aerial vehicle being rotated, or the like) may interfere with another unmanned aerial vehicle. Specifically, as shown on the right side of FIG. 11, there may be a case where sound recording area B of unmanned aerial vehicle 100b overlaps the noise area of noise generated by unmanned aerial vehicle 100a. In this case, the quality of sound recording of unmanned aerial vehicle 100b may degrade due to the noise generated by unmanned aerial vehicle 100a, and the accuracy of estimating the position of sound recording target 200 may also deteriorate.

In order to solve the problem described above, an information processing method according to an aspect of the present disclosure is a method executed by a computer, the information processing method including: determining whether a target sound has been recognized, based on sound data acquired by at least one of a plurality of unmanned aerial vehicles; when it is determined that the target sound has been recognized, acquiring a position and a sound recording direction of each of the plurality of unmanned aerial vehicles; acquiring noise-related information regarding noise generated by the at least one of the plurality of unmanned aerial vehicles; acquiring an estimated position of a sound recording target that is a source of the target sound, the estimated position being estimated from the target sound; determining, based on the estimated position of the sound recording target, the position and the sound recording direction of each of the plurality of unmanned aerial vehicles, and the noise-related information, at least one of a target position and a target sound recording direction of each of the plurality of unmanned aerial vehicles; and outputting, to each of the plurality of unmanned aerial vehicles, at least one of a request for moving to the target position and a request for setting the sound recording direction to the target sound recording direction.

With this configuration, at least one of the target position or the target sound recording direction of each of the plurality of unmanned aerial vehicles is determined based not only on the estimated position of the sound recording target estimated from the target sound, but also on the noise-related information regarding the noise generated by the at least one of the plurality of unmanned aerial vehicles. Accordingly, the plurality of unmanned aerial vehicles can move to the target positions where the noise of the at least one of the plurality of unmanned aerial vehicles does not interfere with sound recording, or can set the sound recording directions to the target sound recording directions where the noise of the at least one of the plurality of unmanned aerial vehicles does not interfere with sound recording. Accordingly, even when a plurality of unmanned aerial vehicles are used, the target sound can be recorded effectively. For this reason, the quality of sound recording of each unmanned aerial vehicle can be improved, and the accuracy of estimating the position of the sound recording target can be improved.

Also, the target sound recording direction of each of the plurality of unmanned aerial vehicles may be a direction in which the each of the plurality of unmanned aerial vehicles moves toward the estimated position of the sound recording target, and the target position of each of the plurality of unmanned aerial vehicles may be a position where the sound recording direction does not overlap a noise area of another one of the plurality of unmanned aerial vehicles estimated from the noise-related information of the other one of the plurality of unmanned aerial vehicles in a state in which the each of the plurality of unmanned aerial vehicles directs the sound recording direction toward the estimated position of the sound recording target.

With this configuration, after each of the plurality of unmanned aerial vehicles has moved to the target position, in a state in which the each of the plurality of unmanned aerial vehicles directs the sound recording direction toward the estimated position of the sound recording target, the sound recording direction does not overlap the noise area of another one of the plurality of unmanned aerial vehicles, and thus the noise of the other one of the plurality of unmanned aerial vehicles does not interfere with the each of the plurality of unmanned aerial vehicles recording the target sound, and the target sound can be recorded effectively. In other words, the noise of an unmanned aerial vehicle is unlikely to be recorded by the microphones of another unmanned aerial vehicle.

Also, the noise-related information may include rotational speed information regarding rotational speeds of rotors included in the unmanned aerial vehicle, and the noise area may be estimated based on the rotational speed Information and a correspondence relationship between a noise level pre-set for each of the rotational speeds of the rotors included in the unmanned aerial vehicle and a distance from the unmanned aerial vehicle.

With this configuration, the correspondence relationship between the noise level for each rotational speed of the rotors and the distance from the unmanned aerial vehicle is pre-set, and thus by checking the acquired rotational speed of the rotors of another unmanned aerial vehicle against the correspondence relationship, the noise area of the other unmanned aerial vehicle can be easily estimated.

Also, the estimated position of the sound recording target may be updated based on the target sound obtained from each of the plurality of unmanned aerial vehicles after the outputting of the request.

With this configuration, at least one of the target position or the target sound recording direction is determined again by using the updated estimated position, and thus the accuracy of estimating the position of the sound recording target can be further enhanced.

Also, an unmanned aerial vehicle other than the at least one of the plurality of unmanned aerial vehicles that has acquired the sound data used to recognize the target sound may be caused to preferentially move to the target position or set the sound recording direction to the target sound recording direction, and the unmanned aerial vehicle is an unmanned aerial vehicle included in the plurality of unmanned aerial vehicles. Specifically, a current position of the at least one of the plurality of unmanned aerial vehicles that has acquired the sound data used to recognize the target sound may be determined as the target position of the at least one of the plurality of unmanned aerial vehicles, and a direction in which the at least one of the plurality of unmanned aerial vehicles moves toward the estimated position of the sound recording target may be determined as the target sound recording direction of the at least one of the plurality of unmanned aerial vehicles.

With this configuration, the at least one of the plurality of unmanned aerial vehicles that has acquired the sound data used to recognize the target sound has already recognized the target sound, and thus the current position is set as the target position, the sound recording direction is set to direct toward the estimated position of the sound recording target, and an unmanned aerial vehicle that has not recognized the target sound and is different from the at least one of the plurality of unmanned aerial vehicles that has acquired the sound data used to recognize the target sound is caused to preferentially move to the target position or set the sound recording direction to the target sound recording direction. Accordingly, the unmanned aerial vehicle that has not recognized the target sound can also recognize the target sound efficiently. That is, the quality of sound recording of each unmanned aerial vehicle can be quickly improved, and the accuracy of estimating the position of the sound recording target can be quickly improved.

Also, at least one of the plurality of unmanned aerial vehicles that has a moving speed higher than moving speeds of the other unmanned aerial vehicles may be preferentially moved.

With this configuration, the at least one of the plurality of unmanned aerial vehicles that has a higher moving speed can arrive at the target position quicker than the other unmanned aerial vehicles, and thus as a result of the at least one of the plurality of unmanned aerial vehicles that has a higher moving speed preferentially moving, the quality of sound recording of the at least one of the plurality of unmanned aerial vehicles can be quickly improved, and the accuracy of estimating the position of the sound recording target can be quickly improved.

Also, the target positions of the plurality of unmanned aerial vehicles may be different from each other, and distances from the target positions of the plurality of unmanned aerial vehicles to the estimated position of the sound recording target may be different from each other.

With this configuration, by using the target position of each of the plurality of unmanned aerial vehicles, and also using a difference in the distance from the estimated position (or in other words, the difference in time required for the target sound from the sound recording target to reach unmanned aerial vehicles), the accuracy of estimating the position of the sound recording target can be further improved.

Also, the target position of each of the plurality of unmanned aerial vehicles may be a position where a sound obstruction does not overlap the sound recording direction in a state in which the each of the plurality of unmanned aerial vehicles directs the sound recording direction toward the estimated position of the sound recording target.

With this configuration, after each of the plurality of unmanned aerial vehicles has moved to the target position, in a state in which the each of the plurality of unmanned aerial vehicles directs the sound recording direction toward the estimated position of the sound recording target, a sound obstruction does not overlap the sound recording direction, and thus the sound obstruction does not interfere with each of the plurality of unmanned aerial vehicles recording the target sound, and thus the target sound can be further effectively recorded.

Also, a moving route to the target position of each of the plurality of unmanned aerial vehicles may be determined based on the estimated position of the sound recording target, the position and the sound recording direction of each of the plurality of unmanned aerial vehicles, and the noise-related information, and the moving route of each of the plurality of unmanned aerial vehicles may be a position where a sound obstruction does not overlap the sound recording direction while the each of the plurality of unmanned aerial vehicles is moving along the moving route in a state in which the each of the plurality of unmanned aerial vehicles directs the sound recording direction toward the estimated position of the sound recording target.

With this configuration, even while each of the plurality of unmanned aerial vehicles is moving to the target position, the target sound can be recorded continuously without interference of the sound obstruction.

Also, furthermore, sound pickup sensitivity for the target sound may be acquired, and the estimated position estimated based on the sound pickup sensitivity may be acquired.

With this configuration, an approximate position of the sound recording target can be estimated according to the sound pickup sensitivity.

Also, a frequency of the target sound may be acquired, the noise-related information may include a frequency of noise generated by the unmanned aerial vehicle, and at least one of the target position or the target sound recording direction of each of the plurality of unmanned aerial vehicles may be determined based on the estimated position of the sound recording target, the position and the sound recording direction of each of the plurality of unmanned aerial vehicles, the noise-related information, and the frequency of the target sound.

With this configuration, by removing the frequency of noise by using a filter or the like, the target sound that has a frequency different from the frequency of noise generated by the sound recording target can be recorded effectively.

An unmanned aerial vehicle according to an aspect of the present disclosure is an unmanned aerial vehicle that is one of a plurality of unmanned aerial vehicles, the unmanned aerial vehicle including: a determiner that determines, based on sound data acquired by at least one of the plurality of unmanned aerial vehicles, whether a target sound has been recognized; an acquirer that, when the determiner determines that the target sound has been recognized, acquires a position and a sound recording direction of each of the plurality of unmanned aerial vehicles, noise-related information regarding noise generated by the at least one of the plurality of unmanned aerial vehicles, and an estimated position of a sound recording target that is a source of the target sound, the estimated position being estimated from the target sound; a decider that decides at least one of a target position and a target sound recording direction of each of the plurality of unmanned aerial vehicles based on the estimated position of the sound recording target, the position and the sound recording direction of each of the plurality of unmanned aerial vehicles, and the noise-related information; and an outputter that outputs, to each of the plurality of unmanned aerial vehicles, at least one of a request for moving to the target position and a request for setting the sound recording direction to the target sound recording direction.

With this configuration, even when a plurality of unmanned aerial vehicles are used, it is possible to provide unmanned aerial vehicles with which the target sound can be recorded effectively. The target sound can be recorded effectively without providing, for example, an external system separately from the plurality of unmanned aerial vehicles.

An unmanned aerial vehicle control system according to an aspect of the present disclosure is an unmanned aerial vehicle control system that controls a plurality of unmanned aerial vehicles, the unmanned aerial vehicle control system including: a determiner that determines, based on sound data acquired by at least one of the plurality of unmanned aerial vehicles, whether a target sound has been recognized; an acquirer that, when the determiner determines that the target sound has been recognized, acquires a position and a sound recording direction of each of the plurality of unmanned aerial vehicles, noise-related information regarding noise generated by the at least one of the plurality of unmanned aerial vehicles, and an estimated position of a sound recording target that is a source of the target sound, the estimated position being estimated from the target sound; a decider that decides at least one of a target position and a target sound recording direction of each of the plurality of unmanned aerial vehicles based on the estimated position of the sound recording target, the position and the sound recording direction of each of the plurality of unmanned aerial vehicles, and the noise-related information; and an outputter that outputs, to each of the plurality of unmanned aerial vehicles, at least one of a request for moving to the target position and a request for setting the sound recording direction to the target sound recording direction.

With this configuration, even when a plurality of unmanned aerial vehicles are used, it is possible to provide an unmanned aerial vehicle control system with which the target sound can be recorded effectively. For example, the unmanned aerial vehicle control system operates to control the plurality of unmanned aerial vehicles, and thus the plurality of unmanned aerial vehicles can easily operate in cooperation with each other.

Generic or specific aspects of the present disclosure may be implemented by a system, a method, an integrated circuit, a computer program or a computer-readable recording medium such as a CD-ROM, or may be implemented by any combination of a system, a method, an integrated circuit, a computer program and a recording medium.

Hereinafter, an information processing method, an unmanned aerial vehicle, and an unmanned aerial vehicle control system according to an aspect of the present disclosure will be described specifically with reference to the drawings.

The embodiments described below show a specific example of the present invention. The numerical values, shapes, materials, structural elements, the arrangement and connection of the structural elements, steps, the order of the steps, and the like shown in the following embodiments are merely examples, and therefore are not Intended to limit the scope of the present invention. Also, among the structural elements described in the following embodiments, structural elements not recited in any one of the independent claims are described as arbitrary structural elements.

Embodiment 1

Hereinafter, Embodiment 1 will be described with reference to FIGS. 1 to 9B.

[Configuration]

FIG. 1 is a block diagram showing an example of a configuration of unmanned aerial vehicle control system 1 according to Embodiment 1. Unmanned aerial vehicle control system 1 is a system for controlling a plurality of unmanned aerial vehicles, and may be implemented by, for example, a controller such as a proportional controller, or a computer such as a server device. Also, unmanned aerial vehicle control system 1 may be a system that includes the plurality of unmanned aerial vehicles. Here, a description will be given assuming that unmanned aerial vehicle control system 1 is a controller provided separately from the plurality of unmanned aerial vehicles.

Unmanned aerial vehicle control system 1 includes processor 10, noise data 20, and communication IF (interface) 30. Unmanned aerial vehicle control system 1 includes, for example, memories such as a ROM (Read Only Memory) and a RAM (Random Access Memory), a communication circuit, and the like. Noise data 20 is stored in a memory, and communication IF 30 is implemented by a communication circuit or the like.

Noise data 20 includes, for example, data that indicates a correspondence relationship between the noise level that is pre-set for each rotational speed (for example, rpm, rps, or the like) of the rotors of an unmanned aerial vehicle and the distance from the unmanned aerial vehicle. A detailed description of noise data 20 will be given later.

Communication IF 30 is a communication interface for unmanned aerial vehicle control system 1 to perform communication with the plurality of unmanned aerial vehicles. There is no particular limitation on the communication standard used by communication IF 30 to perform communication with the plurality of unmanned aerial vehicles.

Processor 10 includes determiner 11, acquirer 12, estimator 13, decider 14, and outputter 15. Determiner 11, acquirer 12, estimator 13, decider 14, and outputter 15 are implemented by processor 10 executing a program stored in a memory. The memory in which the program is stored may be the same as or different from the memory in which noise data 20 is stored.

Determiner 11 determines, based on sound data acquired by at least one of the plurality of unmanned aerial vehicles, whether a target sound has been recognized.

If it is determined that a target sound has been recognized, acquirer 12, estimator 13, decider 14, and outputter 15 perform the following processing operations.

Acquirer 12 acquires the positions and the sound recording directions of the plurality of unmanned aerial vehicles. Also, acquirer 12 acquires noise-related information regarding noise generated by at least one of the plurality of unmanned aerial vehicles. Also, acquirer 12 acquires an estimated position of a sound recording target that is the source of the target sound, the estimated position being estimated from the target sound.

Estimator 13 estimates, based on the noise-related information of at least one of the plurality of unmanned aerial vehicles, a noise area of the unmanned aerial vehicle.

Decider 14 decides at least one of a target position and a target sound recording direction of each of the plurality of unmanned aerial vehicles based on the estimated position, the position and the sound recording direction of each of the plurality of unmanned aerial vehicles, and the noise-related information.

Outputter 15 outputs, to each of the plurality of unmanned aerial vehicles, at least one of a request for moving to the target position or a request for setting the sound recording direction to the target sound recording direction.

A detailed description of determiner 11, acquirer 12, estimator 13, decider 14, and outputter 15 will be given later.

Figure 2:
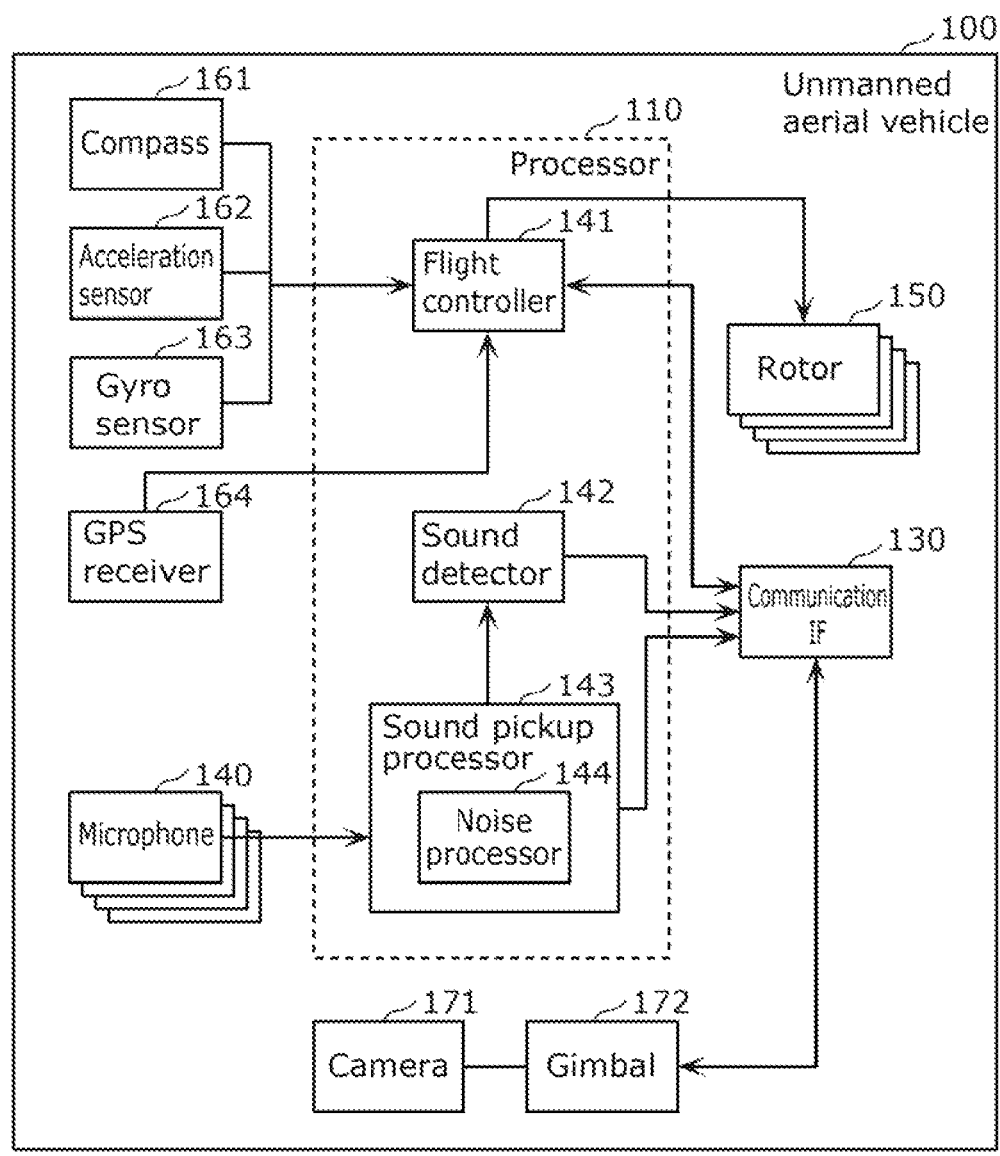
FIG. 2 is a block diagram showing an example of a configuration of an unmanned aerial vehicle according to Embodiment 1.

FIG. 2 is a block diagram showing an example of a configuration of unmanned aerial vehicle 100 according to Embodiment 1. Unmanned aerial vehicle 100 is one of the plurality of unmanned aerial vehicles 100 that are controlled by unmanned aerial vehicle control system 1.

Unmanned aerial vehicle 100 is also called "drone" or "unmanned aircraft". Unmanned aerial vehicle 100 may be used for security, rescue during disaster, and the like.

Unmanned aerial vehicle 100 includes processor 110, communication IF 130, a plurality of microphones 140, a plurality of rotors 150, compass 161, acceleration sensor 162, gyro sensor 163, GPS receiver 164, camera 171, and gimbal 172.

Communication IF 130 is a communication interface for unmanned aerial vehicle 100 to perform communication with unmanned aerial vehicle control system 1. There is no particular limitation on the communication standard used by communication IF 130 to perform communication with unmanned aerial vehicle control system 1.

Compass 161 is a sensor that detects the orientation of unmanned aerial vehicle 100. The plurality of microphones 140, which will be described later, have directivity, and thus, a specific direction with a high directivity Intensity can be detected by compass 161.

Acceleration sensor 162 is a sensor that detects an acceleration in each of three different directions of unmanned aerial vehicle 100.

Gyro sensor 163 is a sensor that detects an angular velocity about each of three axes in three different directions of unmanned aerial vehicle 100.

Each of the plurality of microphones 140 is a directive microphone that can pick up higher quality sound in a sound recording area that is a predetermined angular range relative to a specific direction than in an angular range other than the sound recording area. The specific direction with a high directivity intensity will also be referred to as "sound recording direction". The sound recording area has, for example, an angular range of 90° or less and is a three-dimensional angular area expanding in the sound recording direction relative to the positions of microphones 140. Each of the plurality of microphones 140 may be a microphone array that includes a plurality of microphone elements. Each of the plurality of microphones 140 sequentially generates sound data by performing sound pickup, and sequentially outputs the sequentially generated sound data to processor 110. It is sufficient that unmanned aerial vehicle 100 includes at least one directive microphone.

Each of the plurality of rotors 150 generates a thrust force for unmanned aerial vehicle 100 to fly. Each of the plurality of rotors 150 generates the thrust force for unmanned aerial vehicle 100 to fly by, specifically, rotating to generate an air flow. The plurality of rotors 150 are rotated by, for example, an actuator (a motor or the like), which is not shown in the diagrams.

Gimbal 172 is a device that keeps a triaxial attitude of camera 171 constant. More specifically, gimbal 172 is a device that, even when the attitude of unmanned aerial vehicle 100 changes, maintains the attitude of camera 171 at a desirable attitude with respect to, for example, a terrestrial coordinate system.

Camera 171 is a device that includes an optical system such as a lens, and an image sensor, and is an example of a sensor. Camera 171 sequentially generate image data by capturing images and sequentially outputs the sequentially generated image data to unmanned aerial vehicle control system 1 via communication IF 130.

Processor 110 includes flight controller 141, sound detector 142, and sound pickup processor 143. Processor 110 acquires detection results detected by various sensors such as compass 161, acceleration sensor 162, gyro sensor 163, and the plurality of microphones 140, and reception results received by GPS receiver 164 or communication IF 130, and the like, and executes a program stored in a memory (not shown) for the acquired detection results or the reception results, whereby flight controller 141, sound detector 142, and sound pickup processor 143 are implemented. Accordingly, processor 110 controls communication IF 130 or the plurality of rotors 150.

Flight controller 141 acquires the detection result of detection performed by GPS receiver 164, and detects the current position of unmanned aerial vehicle 100. Then, flight controller 141 controls the flight state of unmanned aerial vehicle 100 by controlling the rotational speeds of the plurality of rotors 150 according to the current position of unmanned aerial vehicle 100, the orientation, the flight speed, and the flight attitude of unmanned aerial vehicle 100 obtained from the detection results of detection performed by compass 161, acceleration sensor 162, and gyro sensor 163, and the flight control signal from unmanned aerial vehicle control system 1 received by communication IF 130.

Sound pickup processor 143 acquires the sound data generated as a result of microphones 140 performing sound pickup, and executes predetermined sound processing on the acquired sound data. Specifically, sound pickup processor 143 includes noise processor 144, and noise processor 144 performs sound source separation processing on the acquired sound data so as to separate the flight noise of unmanned aerial vehicle 100 and the target sound from each other. As used herein, the flight noise of unmanned aerial vehicle 100 (hereinafter, referred to simply as "noise") refers to, for example, noise generated as a result of rotors 150 of unmanned aerial vehicle 100 being rotated. Noise processor 144 extracts the noise or the target sound by applying, for example, a directivity filter for obtaining directivity in an arbitrary direction to sound signals obtained from microphones 140. By doing so, the noise and the target sound are separated from each other. Sound pickup processor 143 transmits the target sound to unmanned aerial vehicle control system 1 via communication IF 130.

Sound detector 142 determines whether the target sound is a specific sound. As used herein, the specific sound refers to, for example, the sound of a suspicious person, the sound of a suspicious unmanned aerial vehicle, the sound of a victim needing rescue during disaster, or the like. For example, features of the sound may be used to determine whether the target sound is a specific sound. For example, as the features of the specific sound, a peak frequency when the sound is converted to a time-dependent frequency (spectrogram) using FFT (Fast Fourier Transform) and the duration of the peak frequency (referred to as "peak time") are stored in advance. Then, sound detector 142 compares the features of the target sound and the features of the specific sound, and determines whether the target sound is a specific sound. For example, sound detector 142 converts the target sound to a spectrogram, and calculates a peak frequency and a peak time as the features of the target sound. Sound detector 142 compares the peak frequency and the peak time of each of the target sound and the specific sound. If an error is smaller than a predetermined threshold value, it is possible to determine that the target sound is a specific sound. The method for making the determination is not particularly limited. For example, if it is determined that the target sound is a specific sound, sound detector 142 transmits information indicating that the sound recording target is a specific sound to unmanned aerial vehicle control system 1 via communication IF 130. For example, in the case where the target sound is the sound of a victim needing rescue during disaster, sound detector 142 transmits Information indicating that the sound recording target is a victim needing rescue during disaster to unmanned aerial vehicle control system 1.

[Noise Data]

Next, a detailed description of noise data 20 will be given with reference to FIGS. 3, 4A, and 4B.

Figure 3:
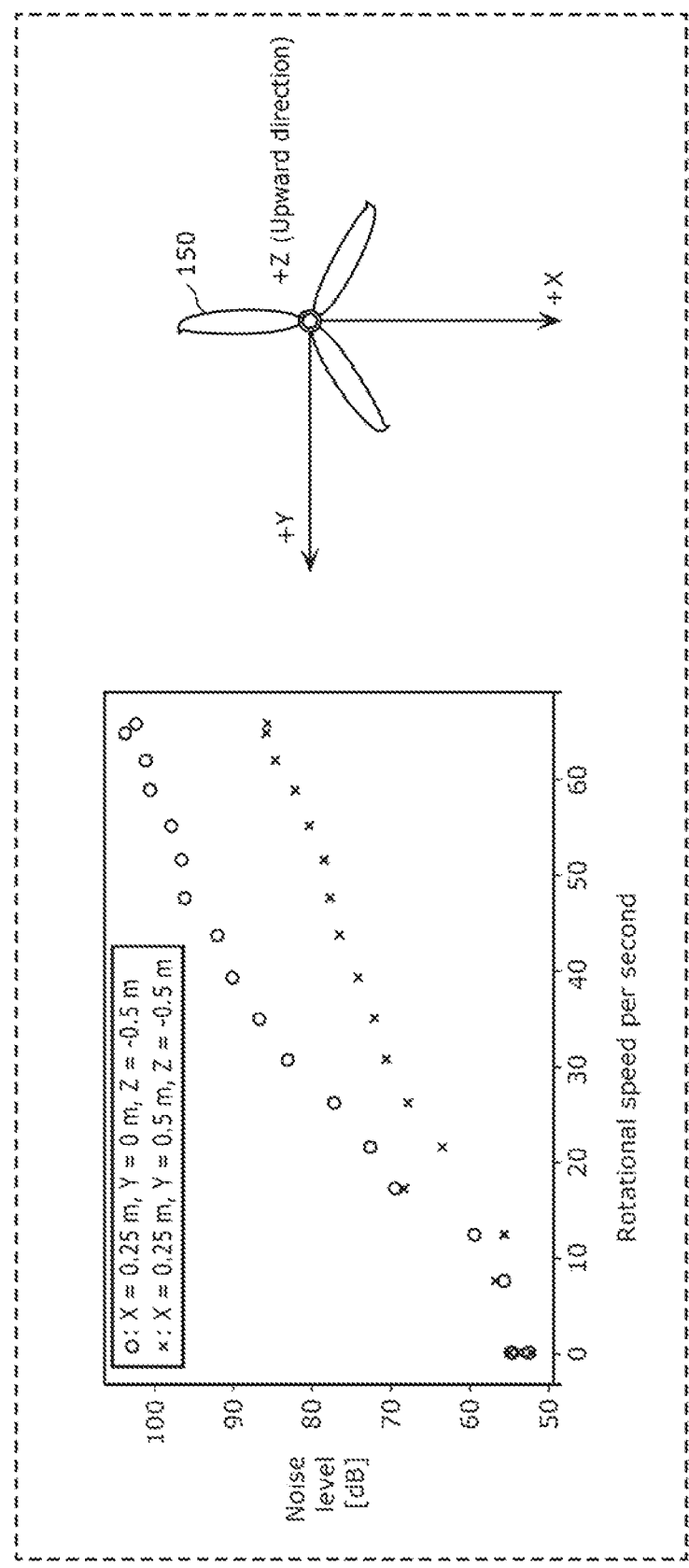
FIG. 3 is a graph showing an example of a relationship between the rotational speed of a rotor and the noise level.

FIG. 3 is a graph showing an example of a relationship between the rotational speed of rotor 150 and the noise level. In FIG. 3, a top view of rotor 150 is also shown as a diagram illustrating measurement locations of the noise level in the graph. In the top view, with the center (the position of the rotation axis) of rotor 150 being set as the origin, two directions that are orthogonal to each other in the horizontal direction are defined as +X axis direction and +Y axis direction, and the upper direction (vertically upward direction) is defined as +Z axis direction.

As shown in FIG. 3, it can be seen that there is a tendency in which the noise level increases as the rotational speed of rotor 150 of unmanned aerial vehicle 100 increases. It can also be seen that, as the distance from rotor 150 increases, although there is still the tendency in which the noise level increases as the rotational speed of rotor 150 increases, the noise level decreases as compared with when the distance from rotor 150 is short. For example, FIG. 3 shows noise levels at a position indicated by X=0.25 m, Y=0 m, and Z=−0.5 m, and at a position indicated by X=0.25 m, Y=0.5 m, and Z=−0.5 m, relative to the center (origin) of rotor 150. The two positions are different only in terms of the parameter in the Y axis direction, and it can be seen that the noise level is lower at the position that is spaced apart from rotor 150 in the +Y axis direction (x marks in FIG. 3). For example, by performing in advance measurement at various points around unmanned aerial vehicle 100 to obtain a correspondence relationship between the rotational speed of rotor 150 and the noise level as shown in the graph shown in FIG. 3, noise data 20 as shown in FIGS. 4A and 4B can be generated for each rotational speed of rotor 150.

Figure 4A:
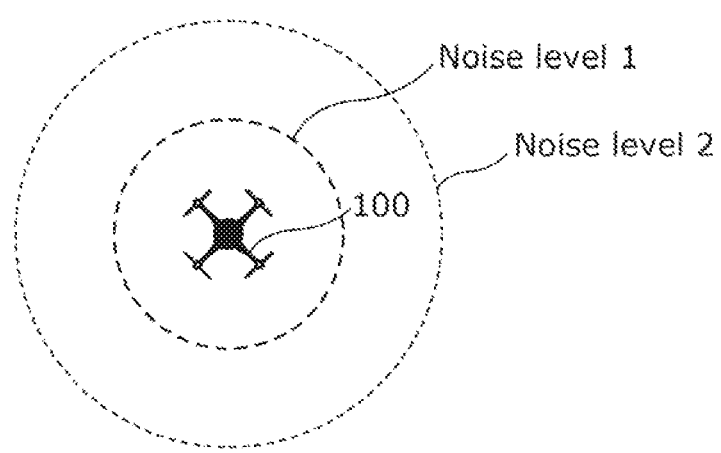
FIG. 4A is a diagram showing an example of a noise area when the unmanned aerial vehicle is viewed from above.

FIG. 4A is a diagram showing an example of noise data 20 when unmanned aerial vehicle 100 is viewed from above.

Figure 4B:
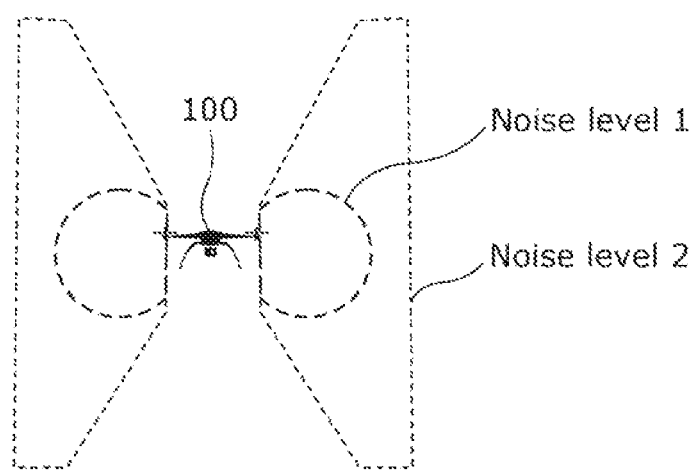
FIG. 4B is a diagram showing an example of a noise area when the unmanned aerial vehicle is viewed from a side.

FIG. 4B Is a diagram showing an example of noise data 20 when unmanned aerial vehicle 100 is viewed from a side.

Noise data 20 includes a noise map (noise area) of noise levels around unmanned aerial vehicle 100 for each rotational speed as shown in FIGS. 4A and 4B. For example, noise level 1 is higher than noise level 2. As shown in FIG. 4A, when unmanned aerial vehicle 100 is viewed from above, the noise level increases as the distance to unmanned aerial vehicle 100 decreases. Also, as shown in FIG. 4B, when unmanned aerial vehicle 100 is viewed from a side, the noise level is low in the up-down direction (vertical direction) of unmanned aerial vehicle 100. In the right-left direction (horizontal direction), the noise level increases as the distance to unmanned aerial vehicle 100 decreases. As described above, a noise map as described above is included in noise data 20 for each rotational speed of rotor 150. Furthermore, a noise map as described above may be included in noise data 20 for each model type of unmanned aerial vehicle 100.

Also, for example, the noise map may be updated by measuring noise level by using a microphone (which may be microphones 140 or a dedicated microphone) included in unmanned aerial vehicle 100. By doing so, even when the current noise levels change from the noise levels of the originally created noise map due to environmental changes, mechanical degradation, or the like, it is possible to generate a noise map suitable for the change.

[Operation]

Next, the operations of unmanned aerial vehicle control system 1 (an information processing method performed by unmanned aerial vehicle control system 1) will be described with reference to FIGS. 5 to 9B.

Figure 5:
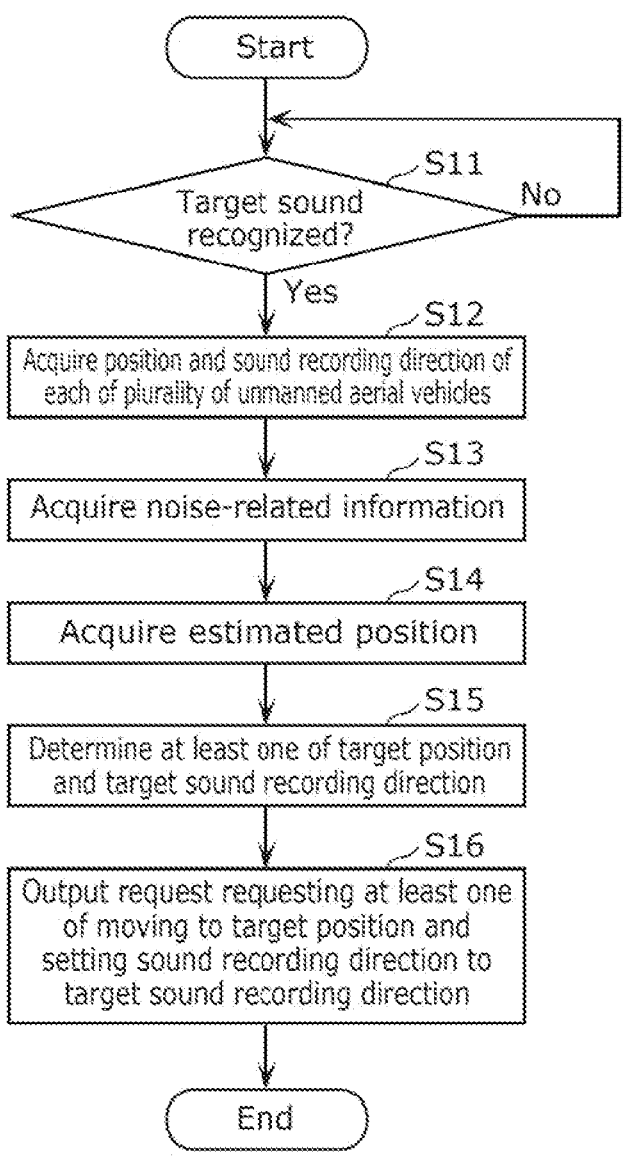
FIG. 5 is a flowchart illustrating an information processing method performed by the unmanned aerial vehicle control system according to Embodiment 1.

FIG. 5 is a flowchart illustrating an example of an information processing method performed by unmanned aerial vehicle control system 1 according to Embodiment 1. Unmanned aerial vehicle control system 1 is implemented by a computer, and thus the information processing method is a computer-implemented method.

Determiner 11 determines, based on the sound data acquired by at least one of the plurality of unmanned aerial vehicles 100, whether the target sound has been recognized (step S11). Specifically, determiner 11 acquires the sound data of the sound recording target acquired by at least one of the plurality of unmanned aerial vehicles 100 in the sound recording area of the unmanned aerial vehicle, and determines whether the target sound (for example, the sound of a suspicious person, the sound of a victim needing rescue during disaster, or the like) has been recognized.

If it is determined that the target sound is not recognized (No in step S11), the processing in step S11 is performed until the target sound is recognized.

If it is determined that the target sound has been recognized (Yes in step S11), acquirer 12 acquires the positions and the sound recording directions of the plurality of unmanned aerial vehicles 100 (step S12). For example, acquirer 12 transmits, to each of the plurality of unmanned aerial vehicles 100, an instruction to acquire the current position and sound recording direction of unmanned aerial vehicle 100 and transmit the acquired information to unmanned aerial vehicle control system 1. For example, acquirer 12 acquires, from each of the plurality of unmanned aerial vehicles 100 via communication IF 30, the position of unmanned aerial vehicle 100 based on the reception results received by GPS receiver 164 included in unmanned aerial vehicle 100 and the sound recording direction of unmanned aerial vehicle 100 based on the detection results of detection performed by compass 161 included in unmanned aerial vehicle 100.

Also, acquirer 12 acquires noise-related information regarding noise generated by at least one of the plurality of unmanned aerial vehicles 100 (step S13). For example, acquirer 12 may acquire noise-related information of each of the plurality of unmanned aerial vehicles 100 including unmanned aerial vehicle 100 that has acquired the sound data used to recognize the target sound. The noise-related information includes, for example, information regarding the rotational speed of rotors 150 of unmanned aerial vehicle 100. Acquirer 12 acquires information regarding the current rotational speed of rotors 150 of unmanned aerial vehicle 100 from unmanned aerial vehicle 100 via communication IF 30.

Also, acquirer 12 acquires an estimated position of the sound recording target that is the source of the target sound, the estimated position being estimated from the target sound (step S14). For example, acquirer 12 may acquire sound pickup sensitivity for the target sound and an estimated position estimated based on the sound pickup sensitivity. If the sound pickup sensitivity is high, it can be estimated that the sound recording target is located on a side of unmanned aerial vehicle 100 in the sound recording area. If the sound pickup sensitivity is low, it can be estimated that the sound recording target is located on a side opposite to unmanned aerial vehicle 100 in the sound recording area. In this way, an approximate position of the sound recording target can be estimated as the estimated position according to the sound pickup sensitivity.

Decider 14 decides at least one of the target position or the target sound recording direction of each of the plurality of unmanned aerial vehicles 100 based on the estimated position, the position and the sound recording direction of each of the plurality of unmanned aerial vehicles 100, and the noise-related information (step S15). For example, the target sound recording direction of each of the plurality of unmanned aerial vehicles 100 is a direction in which unmanned aerial vehicle 100 moves toward the estimated position. For example, the target position of each of the plurality of unmanned aerial vehicles 100 is a position where, in a state in which the sound recording direction of unmanned aerial vehicle 100 is directed toward the estimated position, the noise area of another unmanned aerial vehicle 100 estimated from the noise-related information of the other unmanned aerial vehicle 100 does not overlap the sound recording direction. That is, to describe this with reference to the right side of FIG. 11, the target position is not the position of unmanned aerial vehicle 100b where, in a state in which the sound recording direction of unmanned aerial vehicle 100b is directed toward the estimated position of sound recording target 200, the noise area of unmanned aerial vehicle 100a (the area around unmanned aerial vehicle 100a indicated by a dotted line) overlaps the sound recording direction of unmanned aerial vehicle 100b (the direction from unmanned aerial vehicle 100b toward the estimated position of sound recording target 200).

For example, estimator 13 estimates the noise area of unmanned aerial vehicle 100 based on the correspondence relationship between the noise level and the distance from unmanned aerial vehicle 100 that is pre-set for each rotational speed of rotors 150 of unmanned aerial vehicle 100, and the noise-related information (for example, information regarding rotational speed). As described above, the correspondence relationship between the noise level and the distance from unmanned aerial vehicle 100 is pre-set for each rotational speed of rotors 150, and thus by checking the acquired rotational speed of rotors 150 of unmanned aerial vehicle 100 against the correspondence relationship, the noise area of unmanned aerial vehicle 100 can be easily estimated.

Then, outputter 15 outputs, to each of the plurality of unmanned aerial vehicles 100, at least one of a request for moving to the target position or a request for setting the sound recording direction to the target sound recording direction (step S16). For example, outputter 15 may output, to each of the plurality of unmanned aerial vehicles 100, a flight control signal indicating to perform at least one of moving to the target position or setting the sound recording direction to the target sound recording direction, as the request. Also, for example, outputter 15 may output, to the operator of each of the plurality of unmanned aerial vehicles 100, an instruction indicating at least one of moving to the target position or setting the sound recording direction to the target sound recording direction (for example, by displaying the instruction on an operation screen of a proportional controller or the like), as the request.

Next, a flow for determining the position of the sound recording target, performed by unmanned aerial vehicle control system 1 and the plurality of unmanned aerial vehicles 100 according to Embodiment 1 will be described with reference to FIGS. 6 and 7.

Figure 6:
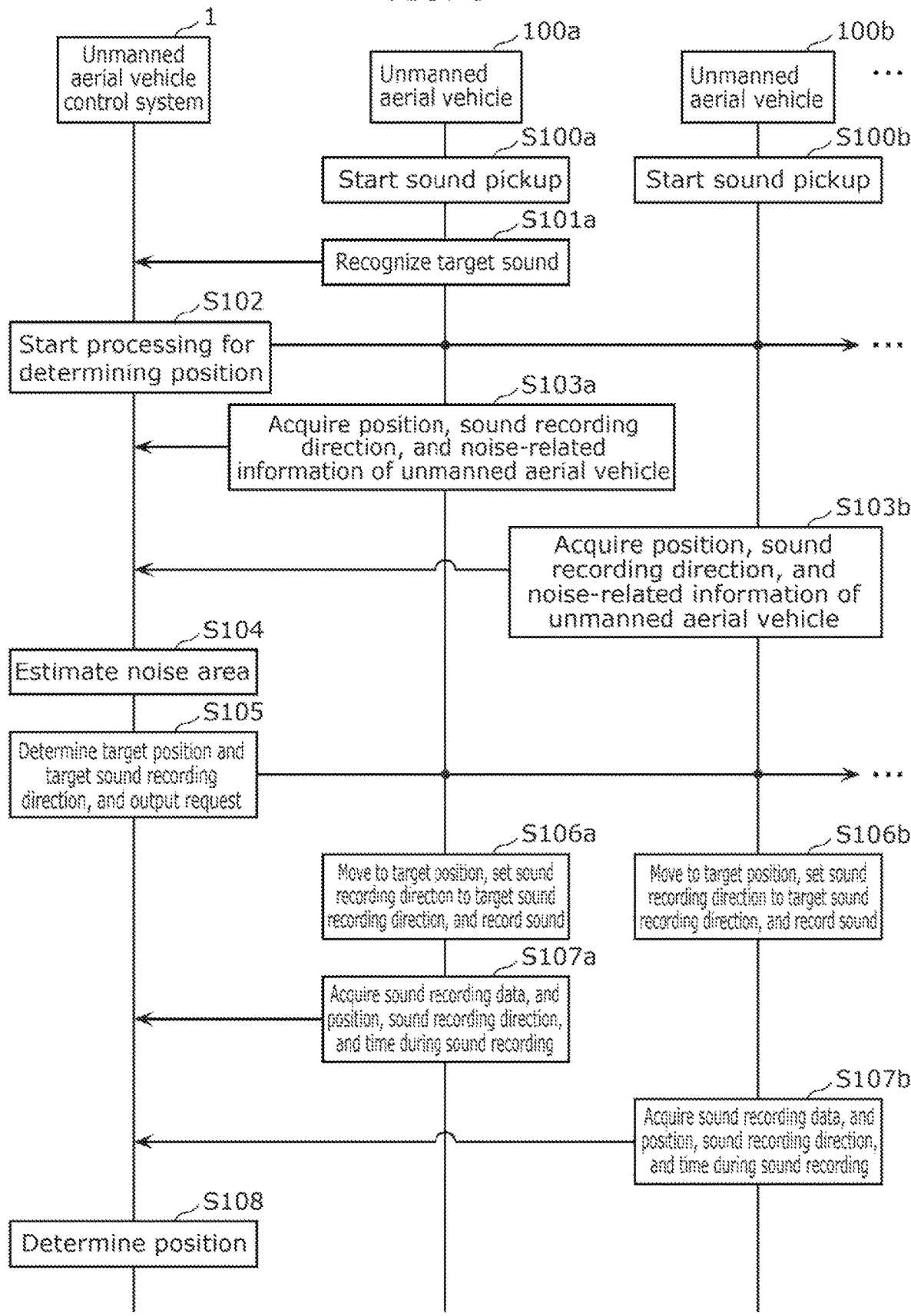
FIG. 6 is a sequence diagram illustrating a flow for determining the position of a sound recording target, performed by the unmanned aerial vehicle control system and a plurality of unmanned aerial vehicles according to Embodiment 1.

FIG. 6 is a sequence diagram showing the flow for determining the position of the sound recording target, performed by unmanned aerial vehicle control system 1 and the plurality of unmanned aerial vehicles 100 according to Embodiment 1.

Figure 7:
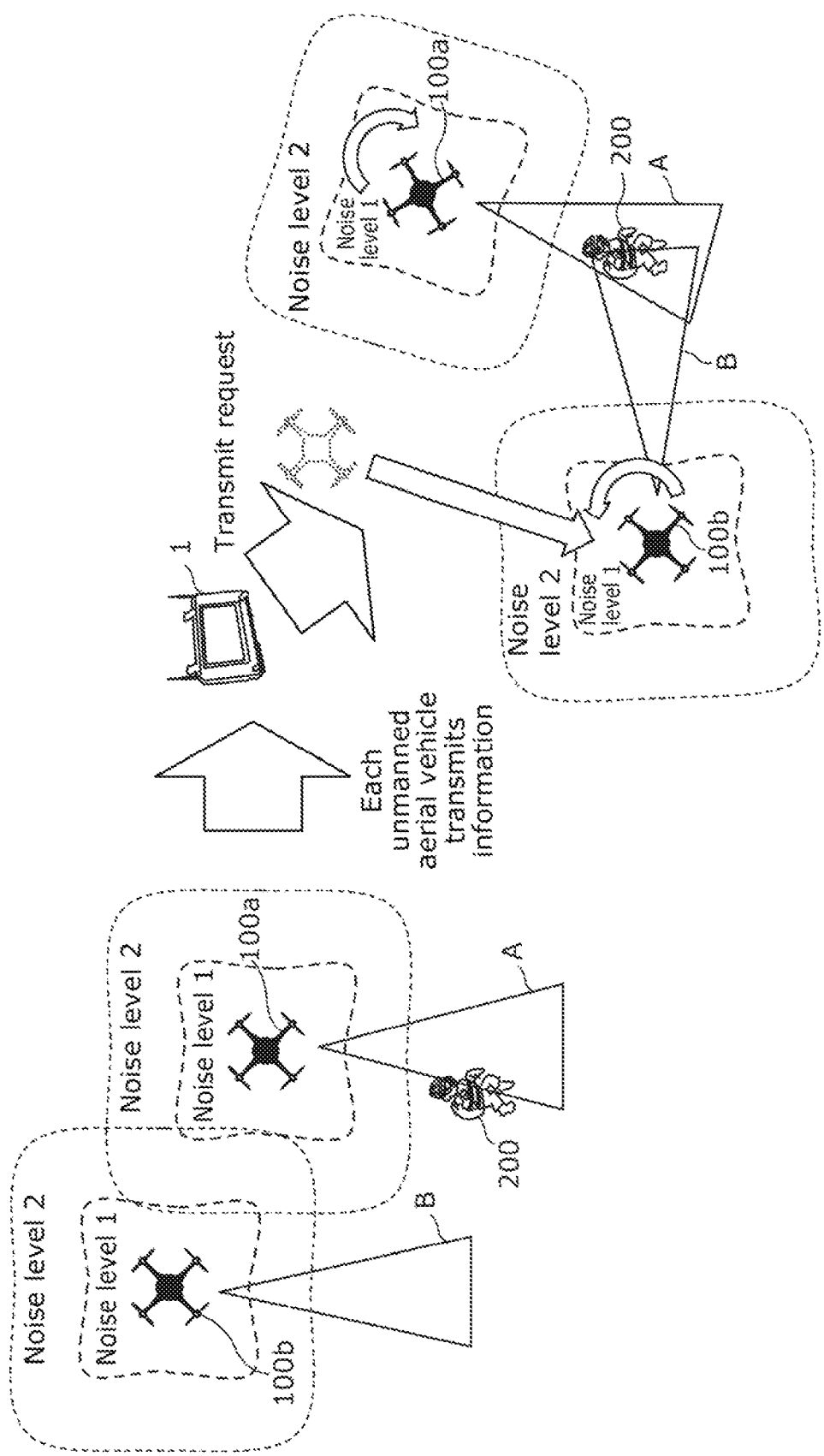
FIG. 7 is an illustrative diagram illustrating an example of how the plurality of unmanned aerial vehicles according to Embodiment 1 move to the target positions and set the sound recording directions to the target sound recording directions.

FIG. 7 is an illustrative diagram illustrating an example of how the plurality of unmanned aerial vehicles 100 according to Embodiment 1 move to the target positions and set the sound recording directions to the target sound recording directions.

For example, the plurality of unmanned aerial vehicles 100 may be three or more unmanned aerial vehicles 100. However, in the specific example given below, attention is given to two unmanned aerial vehicles 100a and 100b out of the plurality of unmanned aerial vehicles 100. The plurality of unmanned aerial vehicles 100 may be only two unmanned aerial vehicles 100.

The plurality of unmanned aerial vehicles 100 (unmanned aerial vehicles 100a and 100b) start sound pickup (steps S100a and S100b). The plurality of unmanned aerial vehicles 100 perform sound pickup while, for example, flying to find suspicious persons, victims needing rescue during disaster, or the like. For example, unmanned aerial vehicle 100a that is at least one of the plurality of unmanned aerial vehicles 100 recognizes a target sound, and transmits information indicating that a target sound has been recognized to unmanned aerial vehicle control system 1 (step S101a). For example, as shown on the left side of FIG. 7, unmanned aerial vehicle 100a picks up a sound generated by sound recording target 200 within sound recording area A, and recognizes the target sound. For example, as a result of unmanned aerial vehicle 100a transmitting information indicating that the target sound is a specific sound (the sound of a suspicious person, the sound of a suspicious unmanned aerial vehicle, the sound of a victim needing rescue during disaster, or the like) to unmanned aerial vehicle control system 1, unmanned aerial vehicle control system 1 knows that unmanned aerial vehicle 100a has recognized the target sound. A configuration is also possible in which unmanned aerial vehicle 100 only acquires the sound data, and unmanned aerial vehicle control system 1 recognizes the target sound.

Unmanned aerial vehicle control system 1 determines that the target sound has been recognized, and starts processing for determining the position (highly accurate position estimation) of sound recording target 200 (step S102). Specifically, unmanned aerial vehicle control system 1 transmits to each of the plurality of unmanned aerial vehicles 100, an instruction to acquire the current position, sound recording direction, and noise-related information of unmanned aerial vehicle 100. Unmanned aerial vehicle control system 1 may transmit an instruction to acquire noise-related information only to unmanned aerial vehicle 100a that recognized the target sound. Also, unmanned aerial vehicle control system 1 estimates the position of sound recording target 200 from the target sound recognized by unmanned aerial vehicle 100a, and acquires the position (estimated position) of sound recording target 200.

Each of the plurality of unmanned aerial vehicles 100 (unmanned aerial vehicles 100a and 100b) acquires the current position, sound recording direction, and noise-related Information of the unmanned aerial vehicle, and transmits the acquired information to unmanned aerial vehicle control system 1 (steps S103a and S103b). In the case where an instruction to acquire noise-related information is transmitted only to unmanned aerial vehicle 100a, unmanned aerial vehicle 100 that is an unmanned aerial vehicle different from unmanned aerial vehicle 100a does not need to acquire and transmit the noise-related information. For example, the noise-related information includes the rotational speed of rotors 150 of unmanned aerial vehicle 100.

Unmanned aerial vehicle control system 1 estimates the noise area of each of the plurality of unmanned aerial vehicles 100 from the noise-related information of the plurality of unmanned aerial vehicles 100 (step S104). For example, unmanned aerial vehicle control system 1 checks the rotational speed of rotors 150 of each of the plurality of unmanned aerial vehicles 100 against noise data 20, and estimates the noise area of each of the plurality of unmanned aerial vehicles 100. In the case where the noise-related information of unmanned aerial vehicle 100 that is an unmanned aerial vehicle different from unmanned aerial vehicle 100a is not transmitted, only the noise area of unmanned aerial vehicle 100a may be estimated.

Each of the plurality of unmanned aerial vehicles 100 may include noise data 20, and each of the plurality of unmanned aerial vehicles 100 may estimate the noise area of the unmanned aerial vehicle by using noise data 20 and the rotational speed of rotors 150 of the unmanned aerial vehicle. In this case, the noise-related information includes the noise area of unmanned aerial vehicle 100.

The noise area may be estimated without using the rotational speed of rotors 150 of unmanned aerial vehicle 100. The noise area may be estimated by using, for example, the noise levels picked up by microphones 140 disposed at specific positions of the main body of unmanned aerial vehicle 100. This is because when the noise levels at specific positions are determined, the noise area around unmanned aerial vehicle 100 can be estimated.

Unmanned aerial vehicle control system 1 determines the target position and the target sound recording direction of each of the plurality of unmanned aerial vehicles 100 based on the estimated position, the position, the sound recording direction, and the noise-related information of each of the plurality of unmanned aerial vehicles 100, and outputs, to each of the plurality of unmanned aerial vehicles 100, at least one of a request for moving to the target position or a request for setting the sound recording direction to the target sound recording direction (step S105).

In response to the request, each of the plurality of unmanned aerial vehicles 100 (unmanned aerial vehicles 100a and 100b) moves to the target position, sets the sound recording direction to the target sound recording direction, and performs sound recording (steps S106a and S106b).

The target sound recording direction of each of the plurality of unmanned aerial vehicles 100 is a direction in which unmanned aerial vehicle 100 moves toward the estimated position. The target position of each of the plurality of unmanned aerial vehicles 100 is a position where, in a state in which the sound recording direction of unmanned aerial vehicle 100 is directed toward the estimated position, the noise area of another unmanned aerial vehicle 100 estimated from the noise-related information of the other unmanned aerial vehicle 100 does not overlap the sound recording direction. It can be seen, on the right side of FIG. 7, that unmanned aerial vehicles 100a and 100b that each have received the request from unmanned aerial vehicle control system 1 set directions in which unmanned aerial vehicles 100a and 100b direct toward the estimated position of sound recording target 200 as the target sound recording directions. Also, unmanned aerial vehicle control system 1 may cause unmanned aerial vehicle 100b, which is one of the plurality of unmanned aerial vehicles 100 that is different from unmanned aerial vehicle 100a that has acquired the sound data used to recognize the target sound, to preferentially move to the target position or set the sound recording direction of unmanned aerial vehicle 100b to the target sound recording direction. Here, unmanned aerial vehicle control system 1 causes unmanned aerial vehicle 100b to preferentially move to the target position, determines the current position of unmanned aerial vehicle 100a that has acquired the sound data used to recognize the target sound as the target position of unmanned aerial vehicle 100a (in other words, unmanned aerial vehicle control system 1 does no cause unmanned aerial vehicle 100a to move), and determines, as the target sound recording direction of unmanned aerial vehicle 100a, a direction in which unmanned aerial vehicle 100a directs toward the estimated position of sound recording target 200.

By doing so, for example, after unmanned aerial vehicle 100b has moved to the target position, the noise area of unmanned aerial vehicle 100a does not overlap the sound recording direction of unmanned aerial vehicle 100b whose sound recording direction (sound recording area B) being directed toward the estimated position. Accordingly, the noise of unmanned aerial vehicle 100a does not interfere with unmanned aerial vehicle 100b recording the target sound, and thus the target sound can be recorded effectively. In the case where the noise area is divided into, for example, two areas: an area of noise level 1; and an area of noise level 2 that is lower than noise level 1, in a state in which the sound recording direction of unmanned aerial vehicle 100b that has moved to the target position is directed toward the estimated position, the target position may be determined such that the area of noise level 1 and the area of noise level 2 as the noise area of unmanned aerial vehicle 100a do not overlap the sound recording direction. If it is difficult to determine the target position such that the two areas do not overlap the sound recording direction, the target position may be determined such that at least the area of noise level 1 does not overlap the sound recording direction.

Also, unmanned aerial vehicle 100a that has acquired the sound data used to recognize the target sound has already recognized the target sound, and thus the current position is set as the target position, the sound recording direction is set to direct toward the estimated position, and unmanned aerial vehicle 100b that has not recognized the target sound and is different from unmanned aerial vehicle 100a is preferentially moved to the target position or set the sound recording direction to the target sound recording direction. Accordingly, in addition to unmanned aerial vehicle 100a that has already recognized the target sound, unmanned aerial vehicle 100b that has not recognized the target sound can also recognize the target sound. That is, the quality of sound recording of each unmanned aerial vehicle 100 can be quickly improved, and the accuracy of estimating the position of the sound recording target can be quickly improved.

FIG. 7 shows an example in which the target position of unmanned aerial vehicle 100b is determined such that the noise area of unmanned aerial vehicle 100a that has acquired the sound data used to recognize the target sound does not overlap the sound recording direction of unmanned aerial vehicle 100b that is an unmanned aerial vehicle different from unmanned aerial vehicle 100a. However, the target position of unmanned aerial vehicle 100a may be determined such that the noise area of unmanned aerial vehicle 100b does not overlap the sound recording direction of unmanned aerial vehicle 100a.

After moving to the target position, each of the plurality of unmanned aerial vehicles 100 (unmanned aerial vehicles 100a and 100b) acquires sound recording data in a state in which the unmanned aerial vehicle directs toward the target sound recording direction, and also acquires the actual position and sound recording direction, and the time during the sound recording, and transmits the acquired information to unmanned aerial vehicle control system 1 (steps S107a and S107b). By doing so, unmanned aerial vehicle control system 1 updates the estimated position from the target sound obtained from each of the plurality of unmanned aerial vehicles 100 after outputting of the request, and thereby determines the position of sound recording target 200, or in other words, estimates the position of sound recording target 200 with high accuracy by using the plurality of unmanned aerial vehicles 100 (step S108). For example, unmanned aerial vehicle control system 1 determines the position of sound recording target 200 based on triangulation performed using the actual position and sound recording direction of each of the plurality of unmanned aerial vehicles 100 during sound pickup, the difference in sound pickup time between unmanned aerial vehicles 100 picking up the same sound from recording target 200, or the like. In this way, at least one of the target position or the target sound recording direction is determined again by using the updated estimated position, and thus the accuracy of estimating the position of the sound recording target can be further enhanced.

If the accuracy of estimating the position of sound recording target 200 is not sufficient in step S108, the processing from step S102 may be performed again. As used herein, the expression "if the accuracy of estimating the position of sound recording target 200 is not sufficient" may mean, for example, a case where, when the position estimated in step S108 is actually confirmed by using, for example, camera 171 or the like, sound recording target 200 is not present at that position. Also, the expression "if the accuracy of estimating the position of sound recording target 200 is not sufficient" may mean, for example, a case where an overlapping area of the sound recording areas of the plurality of unmanned aerial vehicles 100 directed toward the estimated position is large, and thus it is not possible to determine the position of sound recording target 200.

The current position of each of the plurality of unmanned aerial vehicles 100 may be determined as the target position of the unmanned aerial vehicle, and unmanned aerial vehicle 100 that is an unmanned aerial vehicle different from unmanned aerial vehicle 100 that has acquired the sound data used to recognize the target sound may be caused to preferentially set the sound recording direction to the target sound recording direction. This will be explained with reference to FIG. 8.

Figure 8:
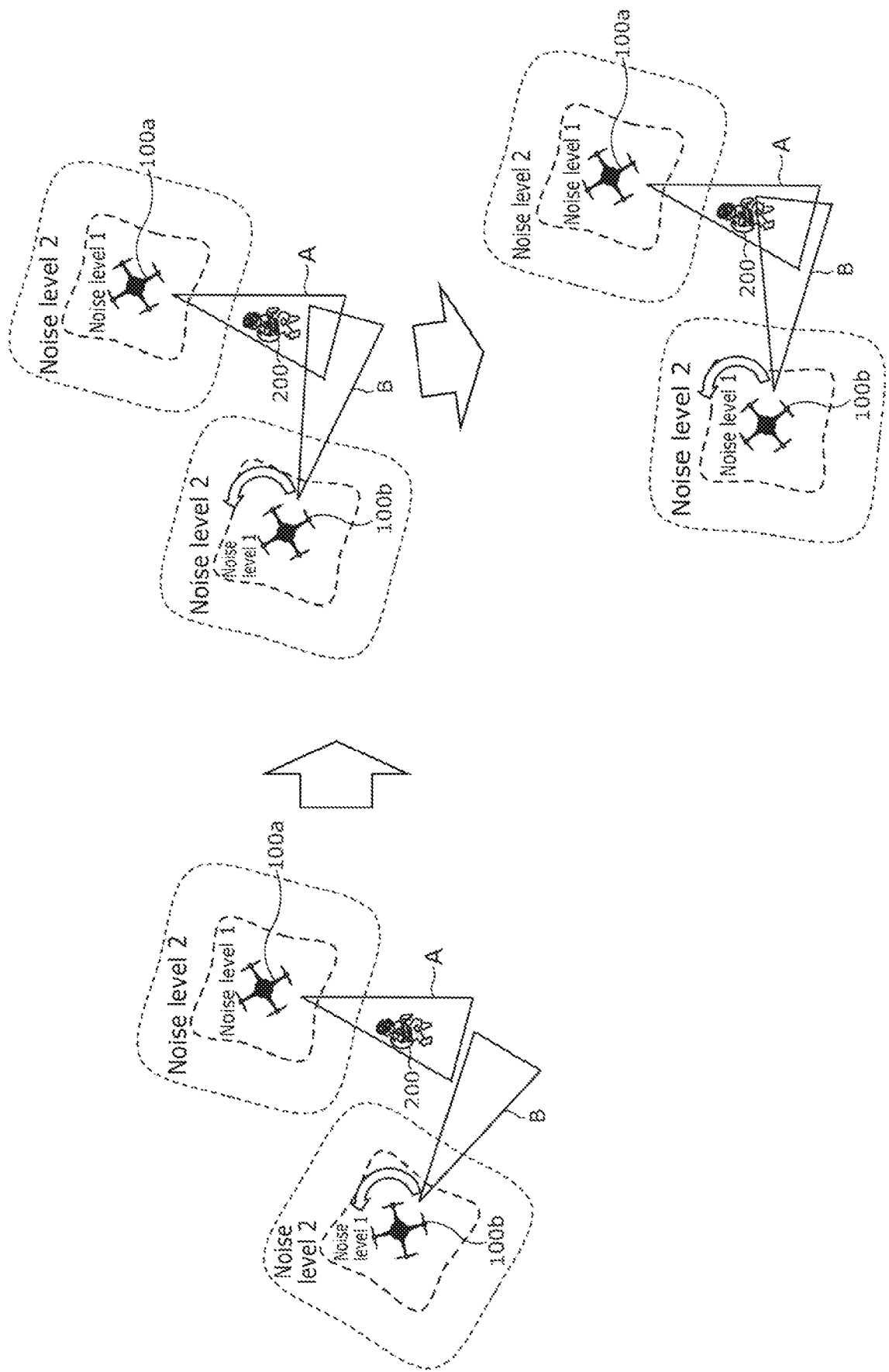
FIG. 8 is a diagram illustrating another example of how the plurality of unmanned aerial vehicles according to Embodiment 1 move to the target positions and set the sound recording directions to the target sound recording directions.

FIG. 8 is a diagram illustrating another example of how the plurality of unmanned aerial vehicles 100 according to Embodiment 1 move to the target positions and set the sound recording directions to the target sound recording directions.

As shown on the left side of FIG. 8, for example, it is assumed that unmanned aerial vehicle 100a recognizes a target sound. In this case, the current positions of the plurality of unmanned aerial vehicles 100 (unmanned aerial vehicles 100a and 100b) are determined as the target positions. That is, unmanned aerial vehicles 100a and 100b stay at the current positions. Then, unmanned aerial vehicle 100b that is an unmanned aerial vehicle different from unmanned aerial vehicle 100a that has acquired the sound data used to recognize the target sound is caused to preferentially set the sound recording direction to the target sound recording direction. Specifically, as shown on the right side of FIG. 8, unmanned aerial vehicle 100b rotates about the vertical axis at the current position, such that the sound recording direction is directed toward the target sound recording direction. As a result, the estimated position of sound recording target 200 is included in sound recording area B of unmanned aerial vehicle 100b, and highly accurate estimation of the position of sound recording target 200 using unmanned aerial vehicles 100a and 100b can be achieved. In the case where it is difficult to prevent the noise area of unmanned aerial vehicle 100a from overlapping the sound recording direction of unmanned aerial vehicle 100b by simply setting the sound recording direction to the target sound recording direction, the target position of at least one of unmanned aerial vehicle 100a or unmanned aerial vehicle 100b may be changed from the current position.

Also, the target sound recording direction may be determined by taking into consideration the type of target sound. This will be explained with reference to FIGS. 9A and 9B.

Figure 9A:
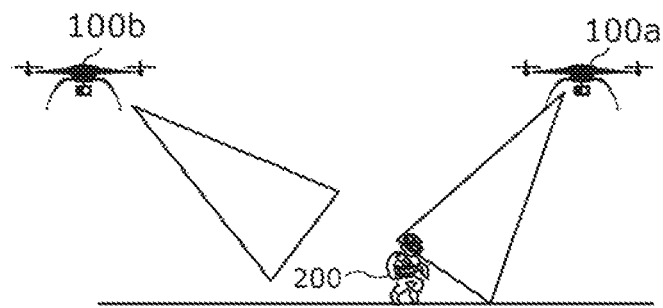
FIG. 9A is a diagram showing an example of a target sound recording direction according to the type of target sound (human voice).
Figure 9B:
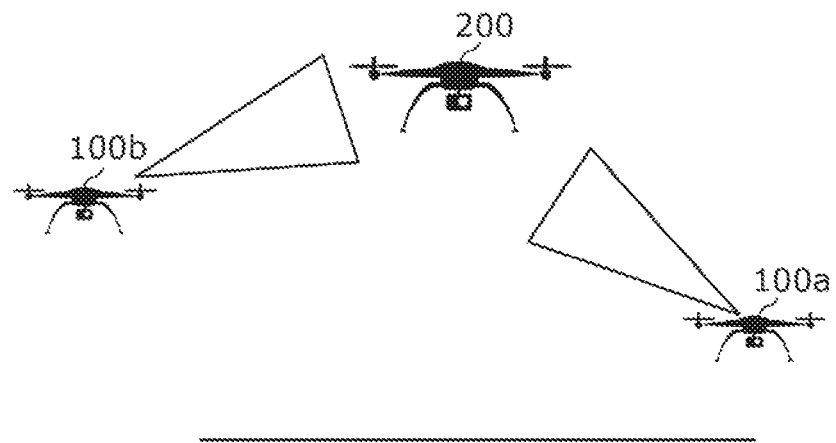
FIG. 9B is a diagram showing another example of the target sound recording direction according to the type of target sound (the flight sound of an unmanned aerial vehicle).

FIG. 9A is a diagram showing an example of the target sound recording direction according to the type of target sound (human voice). FIG. 9B is a diagram showing another example of the target sound recording direction according to the type of target sound (the flight sound of an unmanned aerial vehicle).

As shown in FIG. 9A, it is assumed that unmanned aerial vehicle 100a recognizes, for example, a human voice as the target sound of sound recording target 200. Basically, people are present below (on the ground side of) flying unmanned aerial vehicles 100, and it is therefore unnecessary to take, into consideration, directions other than a direction below unmanned aerial vehicle 100*b* when determining the target sound recording direction of unmanned aerial vehicle 100*b*. That is, the target sound recording direction can be determined easily based only on the direction below unmanned aerial vehicle 100*b*.

On the other hand, as shown in FIG. 9B, it is assumed that unmanned aerial vehicle 100*a* recognizes the flight sound of an unmanned aerial vehicle that is not registered in advance, as the target sound of sound recording target 200. Unmanned aerial vehicles can move over a wide area from the ground to the sky, and thus the target sound recording direction is determined without limiting to a specific direction.

[Conclusion]

In the case where a plurality of unmanned aerial vehicles 100 are used to record a target sound, noise (for example, a flight sound generated as a result of rotors 150 being rotated, or the like) generated by one of the plurality of unmanned aerial vehicles 100 may interfere with the sound recording of another unmanned aerial vehicle 100. To address this, at least one of the target position or the target sound recording direction of each of the plurality of unmanned aerial vehicles 100 is determined based not only on the estimated position of sound recording target 200 estimated from the target sound, but also on the noise-related information regarding the noise generated by unmanned aerial vehicle 100. Accordingly, the plurality of unmanned aerial vehicles 100 can, by also taking the noise-related information into consideration, move to the target position where the noise of unmanned aerial vehicle 100 does not interfere with the sound recording of the other unmanned aerial vehicle 100, or set the sound recording direction to the target sound recording direction in which the noise of unmanned aerial vehicle 100 does not interfere with the sound recording of the other unmanned aerial vehicle 100. Accordingly, even when the plurality of unmanned aerial vehicles 100 are used, the target sound can be recorded effectively. As a result, the quality of sound recording of each unmanned aerial vehicle 100 can be improved, and the accuracy of estimating the position of the sound recording target can be improved.

Embodiment 2

For example, at least one of the plurality of unmanned aerial vehicles 100 may have the functions of unmanned aerial vehicle control system 1 according to Embodiment 1 (specifically, the functions of processor 10). This will be explained with reference to FIG. 10.

Figure 10:
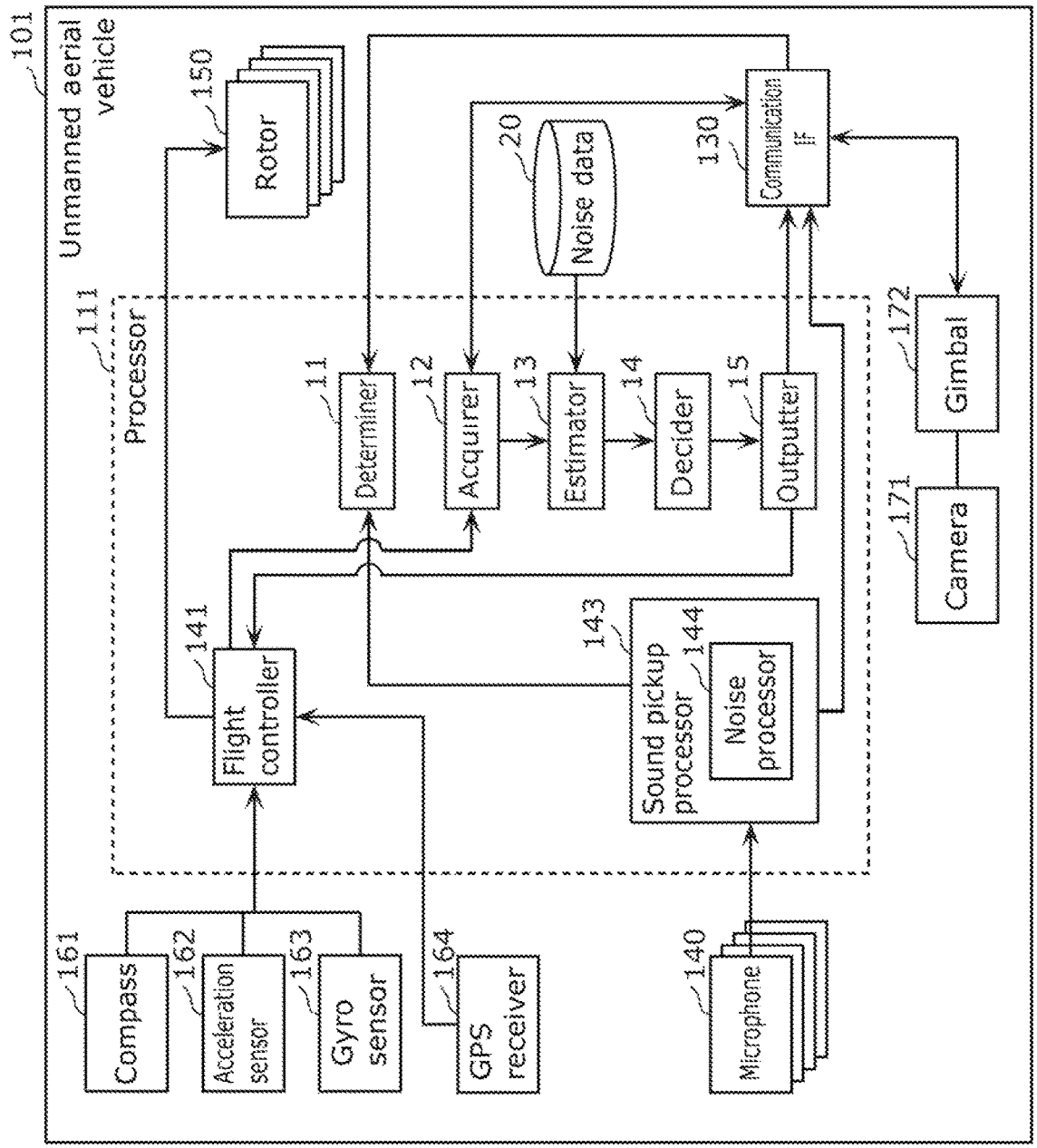
FIG. 10 is a block diagram showing an example of a configuration of an unmanned aerial vehicle according to Embodiment 2.

FIG. 10 is a block diagram showing an example of a configuration of unmanned aerial vehicle 101 according to Embodiment 2.

Unmanned aerial vehicle 101 according to Embodiment 2 is different from unmanned aerial vehicle 100 according to Embodiment 1 in that it includes processor 111 instead of processor 110, and also includes noise data 20. Processor 111 further includes, as the functions of unmanned aerial vehicle control system 1 according to Embodiment 1, determiner 11, acquirer 12, estimator 13, decider 14, and outputter 15. Communication IF 130 is a communication interface for unmanned aerial vehicle 101 to perform communication with other unmanned aerial vehicles. Each of the plurality of unmanned aerial vehicles may have the function of unmanned aerial vehicle control system 1 according to Embodiment 1. Alternatively, any one of the plurality of unmanned aerial vehicles may have the function of unmanned aerial vehicle control system 1 according to Embodiment 1 and control other unmanned aerial vehicles.

Unmanned aerial vehicle 101 is specifically, one of the plurality of unmanned aerial vehicles, and includes: determiner 11 that determines, based on sound data acquired by at least one of the plurality of unmanned aerial vehicles, whether a target sound has been recognized; acquirer 12 that acquires, when it is determined that the target sound has been recognized, a position and a sound recording direction of each of the plurality of unmanned aerial vehicles, noise-related information regarding noise generated by the at least one of the plurality of unmanned aerial vehicles, and an estimated position of a sound recording target that is a source of the target sound, the estimated position being estimated from the target sound; decider 14 that decides at least one of a target position and a target sound recording direction of each of the plurality of unmanned aerial vehicles based on the estimated position, the position and the sound recording direction of each of the plurality of unmanned aerial vehicles, and the noise-related information; and outputter 15 that outputs, to each of the plurality of unmanned aerial vehicles, at least one of a request for moving to the target position or a request for setting the sound recording direction to the target sound recording direction.

The functions of unmanned aerial vehicle control system 1 included in unmanned aerial vehicle 101 are the same as those of unmanned aerial vehicle control system 1 according to Embodiment 1, and thus a detailed description is omitted here.

OTHER EMBODIMENTS

Up to here, the information processing method, unmanned aerial vehicle control system 1, and unmanned aerial vehicle 101 according to one or more aspects of the present disclosure have been described by way of embodiments. However, the present disclosure is not limited to the embodiments given above. Other embodiments obtained by making various modifications that can be conceived by a person having ordinary skill in the art to each of the above embodiments as well as embodiments constructed by combining structural elements of different embodiments without departing from the scope of the present disclosure may also be encompassed within the scope of the one or more aspects of the present disclosure.

For example, in the case where the plurality of unmanned aerial vehicles are caused to move to the target positions, one of the plurality of unmanned aerial vehicles that has a moving speed higher than a moving speed of the other unmanned aerial vehicles may be caused to preferentially move. The unmanned aerial vehicle that has a high moving speed can arrive at the target position quicker than the other unmanned aerial vehicles, and thus as a result of the unmanned aerial vehicle that has a high moving speed being caused to preferentially move, the quality of sound recording of the unmanned aerial vehicle can be quickly improved, and the accuracy of estimating the position of the sound recording target can be quickly improved.

Also, for example, the target positions of the plurality of unmanned aerial vehicles may be different from each other, and distances from the target positions of the plurality of unmanned aerial vehicles to the estimated position of the sound recording target may be different from each other. By also using differences in the distances from the target positions of the plurality of unmanned aerial vehicles to the estimated position of the sound recording target (or in other words, differences in time required for the target sound from the sound recording target to reach the unmanned aerial vehicles), the accuracy of estimating the position of the sound recording target can be further improved.

Also, for example, the target position of each of the plurality of unmanned aerial vehicles may be a position where a sound obstruction does not overlap the sound recording direction in a state in which the each of the plurality of unmanned aerial vehicles directs the sound recording direction toward the estimated position of the sound recording target. After each of the plurality of unmanned aerial vehicles has moved to the target position, in a state in which the sound recording direction is directed toward the estimated position, a sound obstruction does not overlap the sound recording direction, and thus the sound obstruction does not Interfere when each of the plurality of unmanned aerial vehicles recording the target sound. Accordingly, the target sound can be recorded more effectively.

Also, for example, decider 14 may decide, based on the estimated position, the position and the sound recording direction of each of the plurality of unmanned aerial vehicles, and the noise-related information, a moving route to the target position of each of the plurality of unmanned aerial vehicles. The moving route of each of the plurality of unmanned aerial vehicles may be a position where a sound obstruction does not overlap the sound recording direction of the unmanned aerial vehicle while the unmanned aerial vehicle is moving along the moving route, with the sound recording direction being directed toward the estimated position. As a result, even while each of the plurality of unmanned aerial vehicles is moving to the target position, the target sound can be recorded continuously without interference of the sound obstruction.

Also, for example, acquirer 12 may acquire the frequency of the target sound. Also, decider 14 may decide at least one of the target position or the target sound recording direction of each of the plurality of unmanned aerial vehicles based on the estimated position, the position and the sound recording direction of each of the plurality of unmanned aerial vehicles, the noise-related information, and the frequency of the target sound. For example, in the case where the frequency of the target sound and the frequency of noise are in different frequency bands, the frequency of noise may be removed by using a filter or the like. As a result, the target sound that has a frequency different from the frequency of noise generated by the sound recording target can be recorded effectively.

Also, for example, in the embodiments given above, unmanned aerial vehicle control system 1 and unmanned aerial vehicle 101 each include estimator 13 and noise data 20. However, estimator 13 and noise data 20 may be omitted. The noise area of the unmanned aerial vehicle may be estimated by a configuration other than unmanned aerial vehicle control system 1 and unmanned aerial vehicle 101.

The present disclosure can be implemented as a program for causing a processor (for example, processor 10 of unmanned aerial vehicle control system 1 or processor 111 of unmanned aerial vehicle 101) to execute the steps of the information processing method. Furthermore, the present disclosure can be implemented as a computer-readable non-transitory recording medium, such as a CD-ROM, in which the program is recorded.

For example, in the case where the present disclosure is implemented as a program (software), the steps of the information processing method are performed by the program being executed by using hardware resources including a CPU, a memory, an input/output circuit, and the like included in a computer. That is, the steps of the Information processing method are performed by the CPU acquiring data from the memory, the input/output circuit, or the like to perform computation, and outputting the result of computation to the memory, the input/output circuit, or the like.

In the embodiments given above, the structural elements included in unmanned aerial vehicle control system 1 and unmanned aerial vehicle 101 may be configured by dedicated hardware or may be implemented by executing a software program suitable for the structural elements. The structural elements may be implemented by a program executor such as a CPU or a processor reading and executing the software program recorded in a recording medium such as a hard disk or a semiconductor memory.

Some or all of the functions of unmanned aerial vehicle control system 1 and unmanned aerial vehicle 101 according to the embodiments given above are typically implemented as an LSI that is an integrated circuit. They may be configured as individual single chips, or some or all of them may be configured in a single chip. Also, implementation of an integrated circuit is not limited to an LSI, and may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Also, some or all of the functions of unmanned aerial vehicle control system 1 and unmanned aerial vehicle 101 according to the embodiments given above may be implemented by a processor such as a CPU executing a program.

Also, some or all of the functions of unmanned aerial vehicle control system 1 according to the embodiments given above may be implemented by being executed by an external server.

Also, some or all of the functions of unmanned aerial vehicle control system 1 according to the embodiments given above may be implemented by being executed by a plurality of external servers. That is, determiner 11, acquirer 12, decider 14, and outputter 15 that are functional structural elements of processor 10 may be provided dispersively in a plurality of external servers.

Also, the order in which the steps of the information processing method are performed is merely given as an example to specifically describe the present disclosure, and thus the steps may be performed in any order other than the order described above as long as the same effects can be obtained. Also, some of the steps may be performed simultaneously with (for example, in parallel to) other steps.

Furthermore, variations obtained by making various modifications that can be conceived by a person having ordinary skill in the art to each of the above embodiments of the present disclosure without departing from the gist of the present disclosure are also encompassed within the scope of the present disclosure.

INDUSTRIAL APPLICABILITY

The present disclosure is applicable to, for example, a system that includes a plurality of unmanned aerial vehicles.

The invention claimed is:

1. An information processing method executed by a computer, the information processing method comprising:
   determining whether a target sound has been recognized, based on sound data acquired by at least one of a plurality of unmanned aerial vehicles;
   when it is determined that the target sound has been recognized, acquiring a position and a sound recording direction of each of the plurality of unmanned aerial vehicles;

acquiring noise-related information regarding noise generated by the at least one of the plurality of unmanned aerial vehicles;

acquiring an estimated position of a sound recording target that is a source of the target sound, the estimated position being estimated from the target sound;

determining, based on the estimated position of the sound recording target, the position and the sound recording direction of each of the plurality of unmanned aerial vehicles, and the noise-related information, at least one of a target position and a target sound recording direction of each of the plurality of unmanned aerial vehicles; and outputting, to each of the plurality of unmanned aerial vehicles, at least one of a request for moving to the target position and a request for setting the sound recording direction to the target sound recording direction.

2. The information processing method according to claim 1, wherein the target sound recording direction of each of the plurality of unmanned aerial vehicles is a direction in which the each of the plurality of unmanned aerial vehicles moves toward the estimated position of the sound recording target, and the target position of each of the plurality of unmanned aerial vehicles is a position where the sound recording direction does not overlap a noise area of another one of the plurality of unmanned aerial vehicles estimated from the noise-related information of the other one of the plurality of unmanned aerial vehicles in a state in which the each of the plurality of unmanned aerial vehicles directs the sound recording direction toward the estimated position of the sound recording target.

3. The information processing method according to claim 2, wherein the noise-related information includes rotational speed Information regarding rotational speeds of rotors included in the unmanned aerial vehicle, and the noise area is estimated based on the rotational speed information and a correspondence relationship between a noise level pre-set for each of the rotational speeds of the rotors included in the unmanned aerial vehicle and a distance from the unmanned aerial vehicle.

4. The information processing method according to claim 1, wherein the estimated position of the sound recording target is updated based on the target sound obtained from each of the plurality of unmanned aerial vehicles after the outputting of the request.

5. The information processing method according to claim 1, wherein an unmanned aerial vehicle other than the at least one of the plurality of unmanned aerial vehicles that has acquired the sound data used to recognize the target sound is caused to preferentially move to the target position or set the sound recording direction to the target sound recording direction, and the unmanned aerial vehicle is an unmanned aerial vehicle included in the plurality of unmanned aerial vehicles.

6. The information processing method according to claim 5, wherein a current position of the at least one of the plurality of unmanned aerial vehicles that has acquired the sound data used to recognize the target sound is determined as the target position of the at least one of the plurality of unmanned aerial vehicles, and a direction in which the at least one of the plurality of unmanned aerial vehicles moves toward the estimated position of the sound recording target is determined as the target sound recording direction of the at least one of the plurality of unmanned aerial vehicles.

7. The information processing method according to claim 1, wherein at least one of the plurality of unmanned aerial vehicles that has a moving speed higher than moving speeds of the other unmanned aerial vehicles is preferentially moved.

8. The information processing method according to claim 1, wherein the target positions of the plurality of unmanned aerial vehicles are different from each other, and distances from the target positions of the plurality of unmanned aerial vehicles to the estimated position of the sound recording target are different from each other.

9. The information processing method according to claim 1, wherein the target position of each of the plurality of unmanned aerial vehicles is a position where a sound obstruction does not overlap the sound recording direction in a state in which the each of the plurality of unmanned aerial vehicles directs the sound recording direction toward the estimated position of the sound recording target.

10. The information processing method according to claim 1, wherein a moving route to the target position of each of the plurality of unmanned aerial vehicles is determined based on the estimated position of the sound recording target, the position and the sound recording direction of each of the plurality of unmanned aerial vehicles, and the noise-related information, and the moving route of each of the plurality of unmanned aerial vehicles is a position where a sound obstruction does not overlap the sound recording direction while the each of the plurality of unmanned aerial vehicles is moving along the moving route in a state in which the each of the plurality of unmanned aerial vehicles directs the sound recording direction toward the estimated position of the sound recording target.

11. The information processing method according to claim 1, further comprising:

acquiring sound pickup sensitivity for the target sound; and acquiring the estimated position estimated based on the sound pickup sensitivity.

12. The information processing method according to claim 1, further comprising:

acquiring a frequency of the target sound, wherein the noise-related information includes a frequency of noise generated by the unmanned aerial vehicle, and at least one of the target position or the target sound recording direction of each of the plurality of unmanned aerial vehicles is determined based on the estimated position of the sound recording target, the position and the sound recording direction of each of the plurality of unmanned aerial vehicles, the noise-related information, and the frequency of the target sound.

13. An unmanned aerial vehicle that is one of a plurality of unmanned aerial vehicles, the unmanned aerial vehicle comprising:
- a determiner that determines whether a target sound has been recognized, based on sound data acquired by at least one of the plurality of unmanned aerial vehicles;
- an acquirer that, when the determiner determines that the target sound has been recognized, acquires a position and a sound recording direction of each of the plurality of unmanned aerial vehicles, noise-related information regarding noise generated by the at least one of the plurality of unmanned aerial vehicles, and an estimated position of a sound recording target that is a source of the target sound, the estimated position being estimated from the target sound;
- a decider that decides at least one of a target position and a target sound recording direction of each of the plurality of unmanned aerial vehicles based on the estimated position of the sound recording target, the position and the sound recording direction of each of the plurality of unmanned aerial vehicles, and the noise-related information; and
- an outputter that outputs, to each of the plurality of unmanned aerial vehicles, at least one of a request for moving to the target position and a request for setting the sound recording direction to the target sound recording direction.

14. An unmanned aerial vehicle control system that controls a plurality of unmanned aerial vehicles, the unmanned aerial vehicle control system comprising:
- a determiner that determines whether a target sound has been recognized, based on sound data acquired by at least one of the plurality of unmanned aerial vehicles;
- an acquirer that, when the determiner determines that the target sound has been recognized, acquires a position and a sound recording direction of each of the plurality of unmanned aerial vehicles, noise-related information regarding noise generated by the at least one of the plurality of unmanned aerial vehicles, and an estimated position of a sound recording target that is a source of the target sound, the estimated position being estimated from the target sound;
- a decider that decides at least one of a target position and a target sound recording direction of each of the plurality of unmanned aerial vehicles based on the estimated position of the sound recording target, the position and the sound recording direction of each of the plurality of unmanned aerial vehicles, and the noise-related information; and
- an outputter that outputs, to each of the plurality of unmanned aerial vehicles, at least one of a request for moving to the target position and a request for setting the sound recording direction to the target sound recording direction.

\* \* \* \* \*